(12) United States Patent
Jin et al.

(10) Patent No.: US 10,876,749 B2
(45) Date of Patent: Dec. 29, 2020

(54) AIR CONDITIONER AND CONTROLLING METHOD THEREOF

(71) Applicant: KYUNGDONG NAVIEN CO., LTD., Pyeongtaek-si (KR)

(72) Inventors: Won Jae Jin, Anyang-si (KR); Ju Hyuk Lee, Anyang-si (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 197 days.

(21) Appl. No.: 16/042,638

(22) Filed: Jul. 23, 2018

(65) Prior Publication Data
US 2019/0063777 A1    Feb. 28, 2019

(30) Foreign Application Priority Data

Aug. 31, 2017    (KR) ........................ 10-2017-0111354

(51) Int. Cl.
| | |
|---|---|
| *F24F 7/08* | (2006.01) |
| *F24F 7/04* | (2006.01) |
| *F24F 11/65* | (2018.01) |
| *F24F 11/81* | (2018.01) |
| *F24F 5/00* | (2006.01) |
| *F24F 3/14* | (2006.01) |

(Continued)

(52) U.S. Cl.
CPC ................. *F24F 7/08* (2013.01); *F24F 3/14* (2013.01); *F24F 5/0035* (2013.01); *F24F 6/02* (2013.01); *F24F 7/04* (2013.01); *F24F 11/65* (2018.01); *F24F 11/67* (2018.01); *F24F 11/81* (2018.01); *F24F 13/02* (2013.01); *F24F 13/10* (2013.01); *F24F 13/28* (2013.01); *F24F 2110/10* (2018.01); *F24F 2110/20* (2018.01); *F24F 2203/10* (2013.01); *F24F 2203/1016* (2013.01); *F24F 2203/1024* (2013.01); *F24F 2203/1032* (2013.01)

(58) Field of Classification Search
CPC .. F24F 7/08; F24F 11/81; F24F 3/1423; F24F 2012/007; F24F 2203/1032; F24F 2203/1068; F24F 2203/1084
See application file for complete search history.

(56) References Cited

U.S. PATENT DOCUMENTS

| | | | |
|---|---|---|---|
| 2011/0079024 A1* | 4/2011 | Hakbijl | F24F 5/0035 62/56 |
| 2013/0048267 A1* | 2/2013 | Koretomo | F24F 13/14 165/300 |
| 2018/0328603 A1* | 11/2018 | Lee | F24F 3/14 |

FOREIGN PATENT DOCUMENTS

| | | |
|---|---|---|
| CN | 106662355 A | 5/2017 |
| JP | 2002-224529 A | 8/2002 |

(Continued)

*Primary Examiner* — Elizabeth J Martin
(74) *Attorney, Agent, or Firm* — Stein IP, LLC

(57) ABSTRACT

An air conditioner includes an indoor introduction air path configured to introduce air into an indoor space and an outdoor discharge air path configured to discharge air to an outdoor space, wherein the outdoor discharge air path includes an air path in which heat exchange is performed with the air introduced into the indoor space, and a by-pass path in which heat exchange is not performed with the air introduced into the indoor space, and the air conditioner further includes a controller configured to control the air discharged to the outdoor space so that the air discharged to the outdoor space flows to one of the air paths, in which the heat exchange is performed, and the by-pass path.

15 Claims, 8 Drawing Sheets

(51) Int. Cl.
*F24F 13/02* (2006.01)
*F24F 13/10* (2006.01)
*F24F 6/02* (2006.01)
*F24F 11/67* (2018.01)
*F24F 110/20* (2018.01)
*F24F 110/10* (2018.01)
*F24F 13/28* (2006.01)

(56) References Cited

FOREIGN PATENT DOCUMENTS

| | | |
|---|---|---|
| KR | 10-2006-0037583 A | 5/2006 |
| KR | 10-2013-0142259 A | 12/2013 |
| KR | 10-2016-0088846 A | 7/2016 |

\* cited by examiner

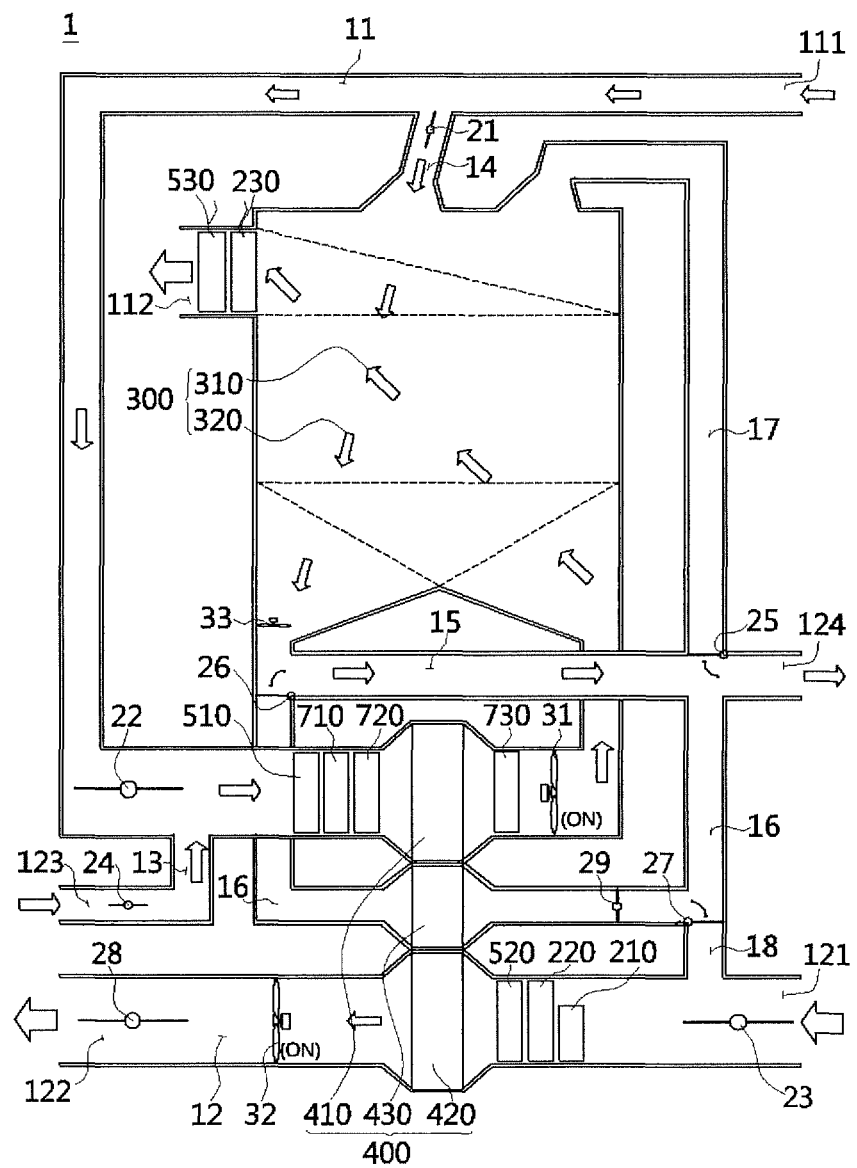
[FIG. 2]

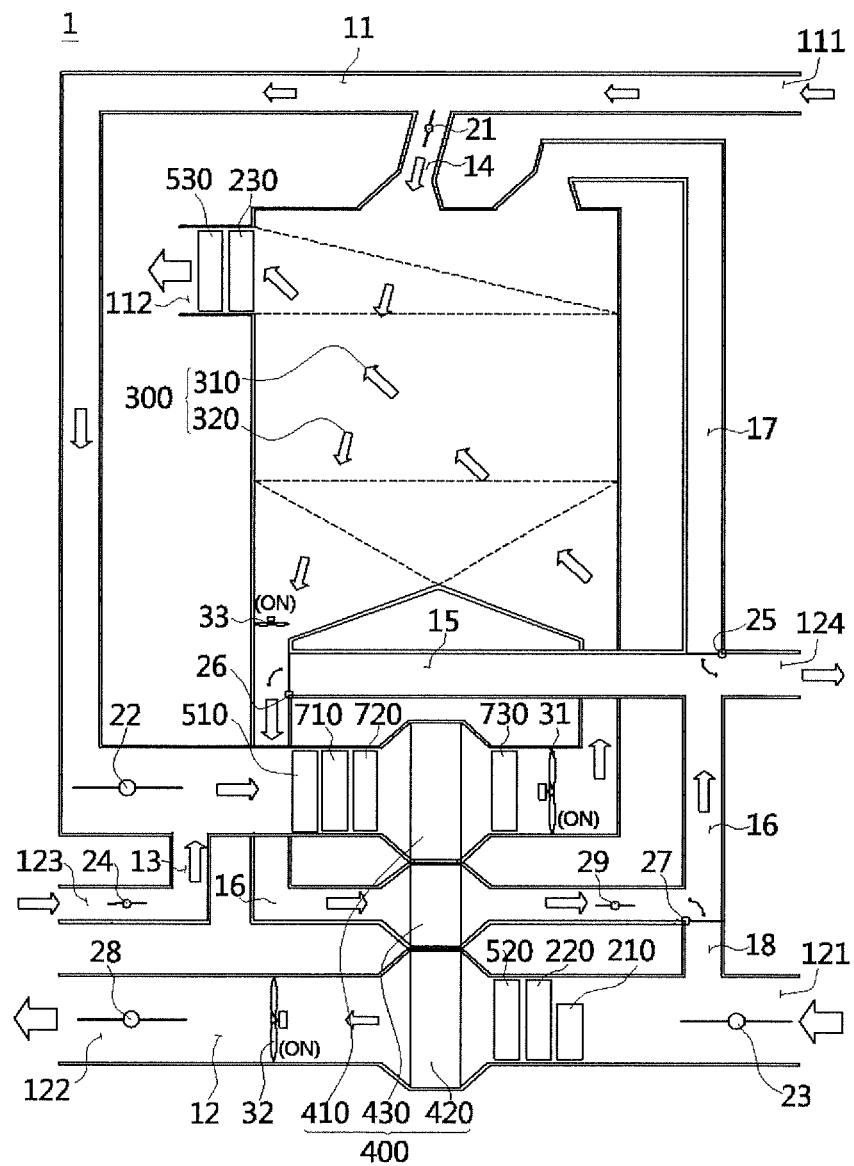
[FIG. 3]

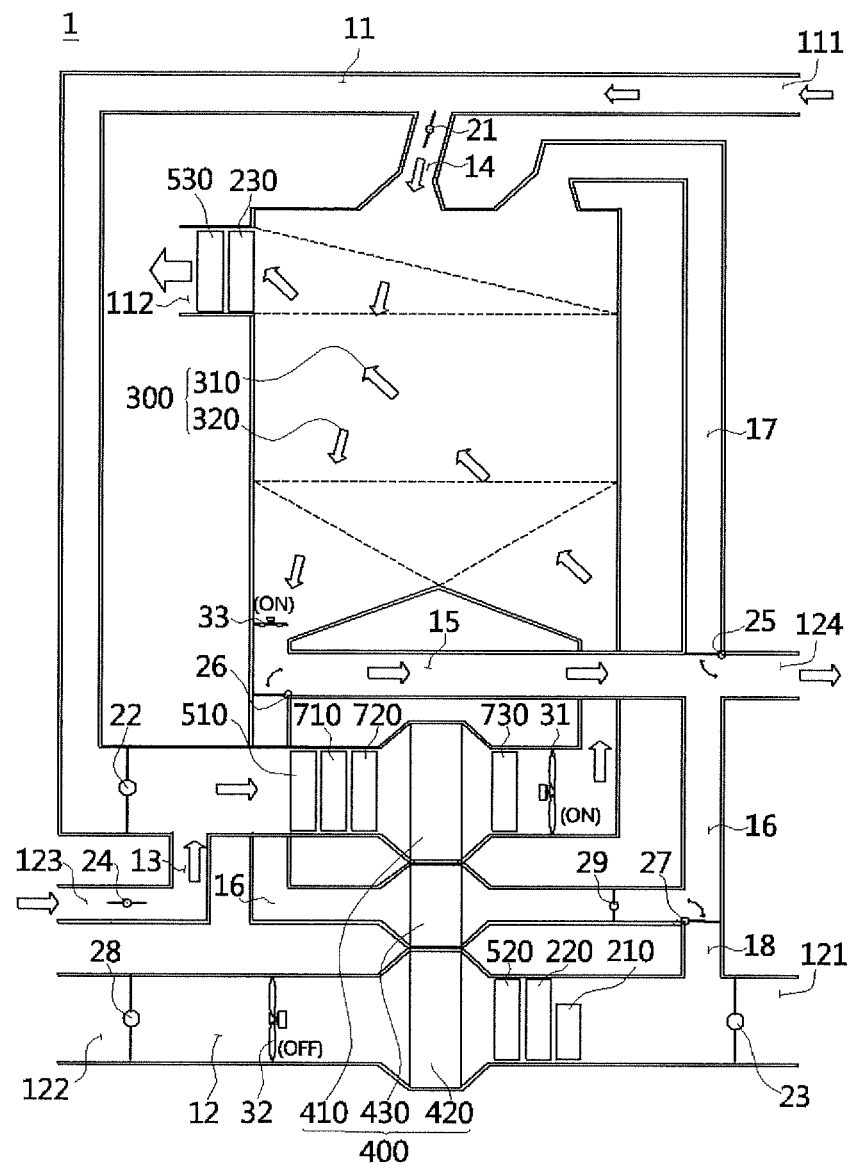
[FIG. 4]

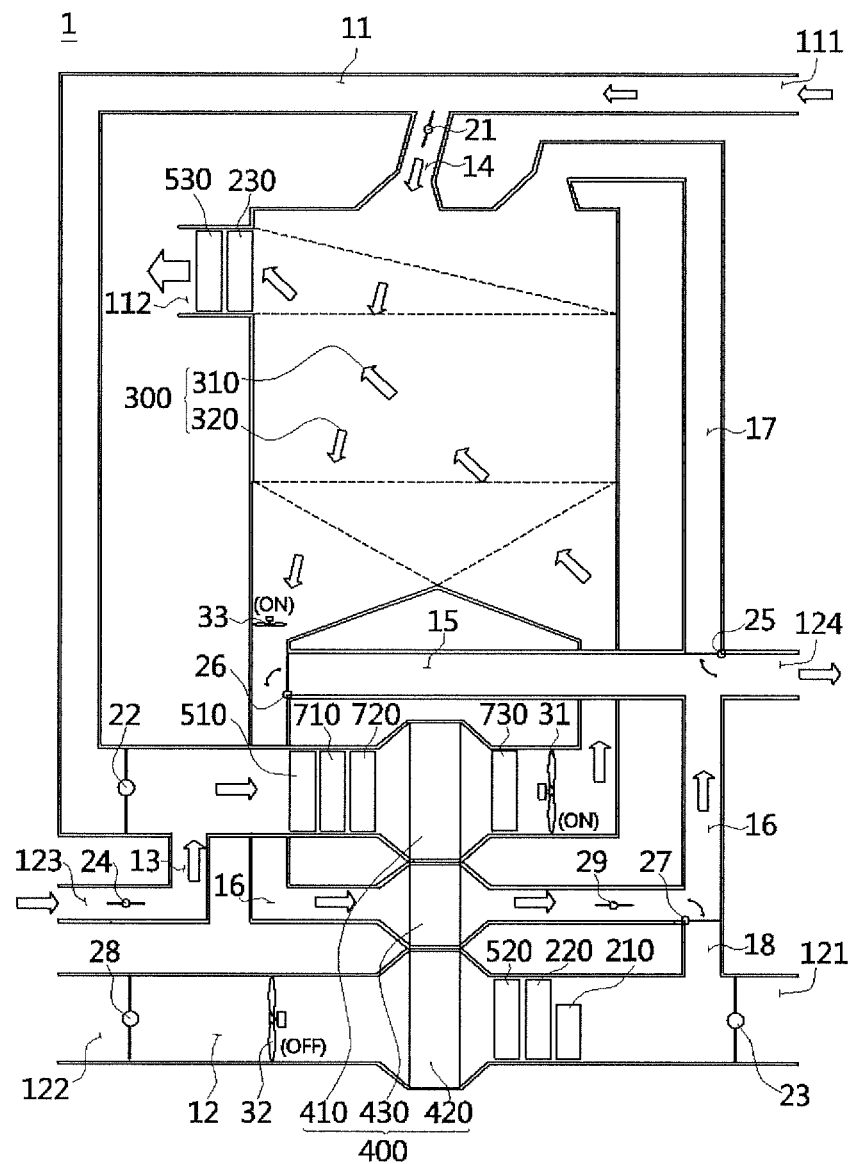
[FIG. 5]

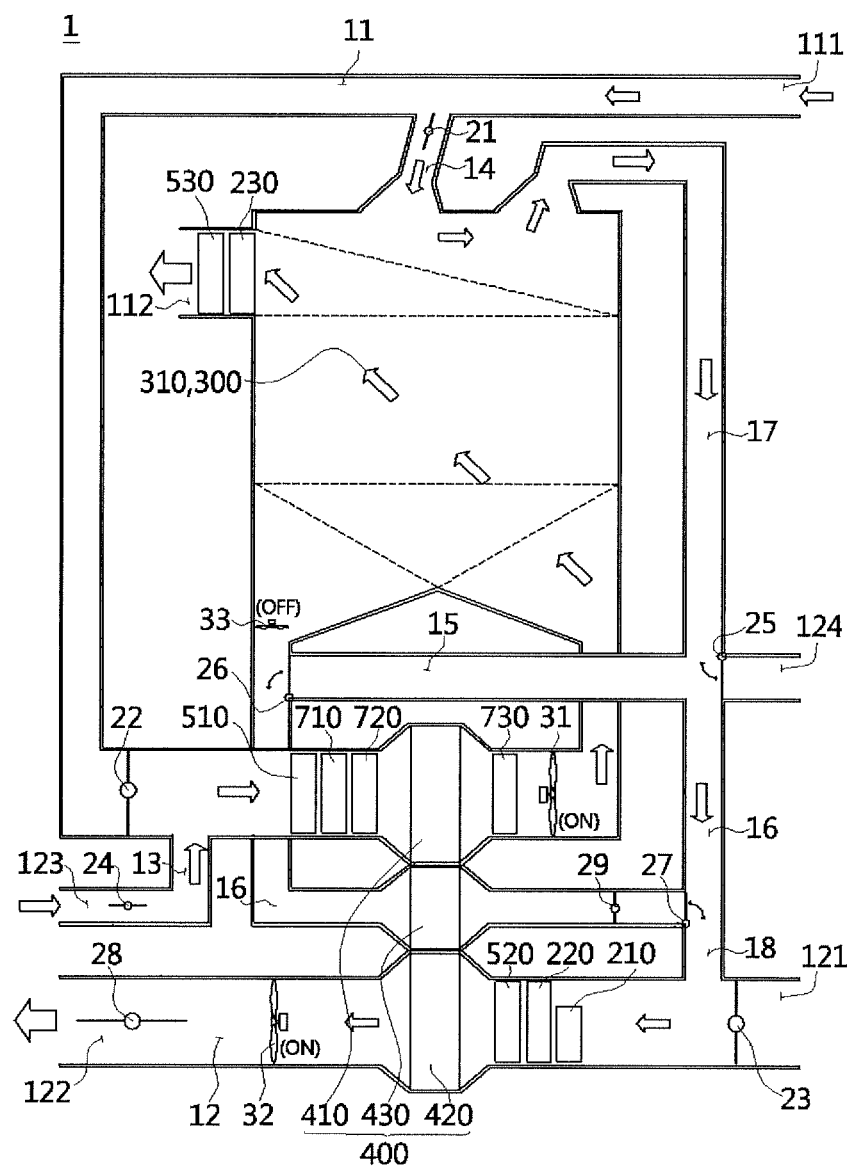
[FIG. 6]

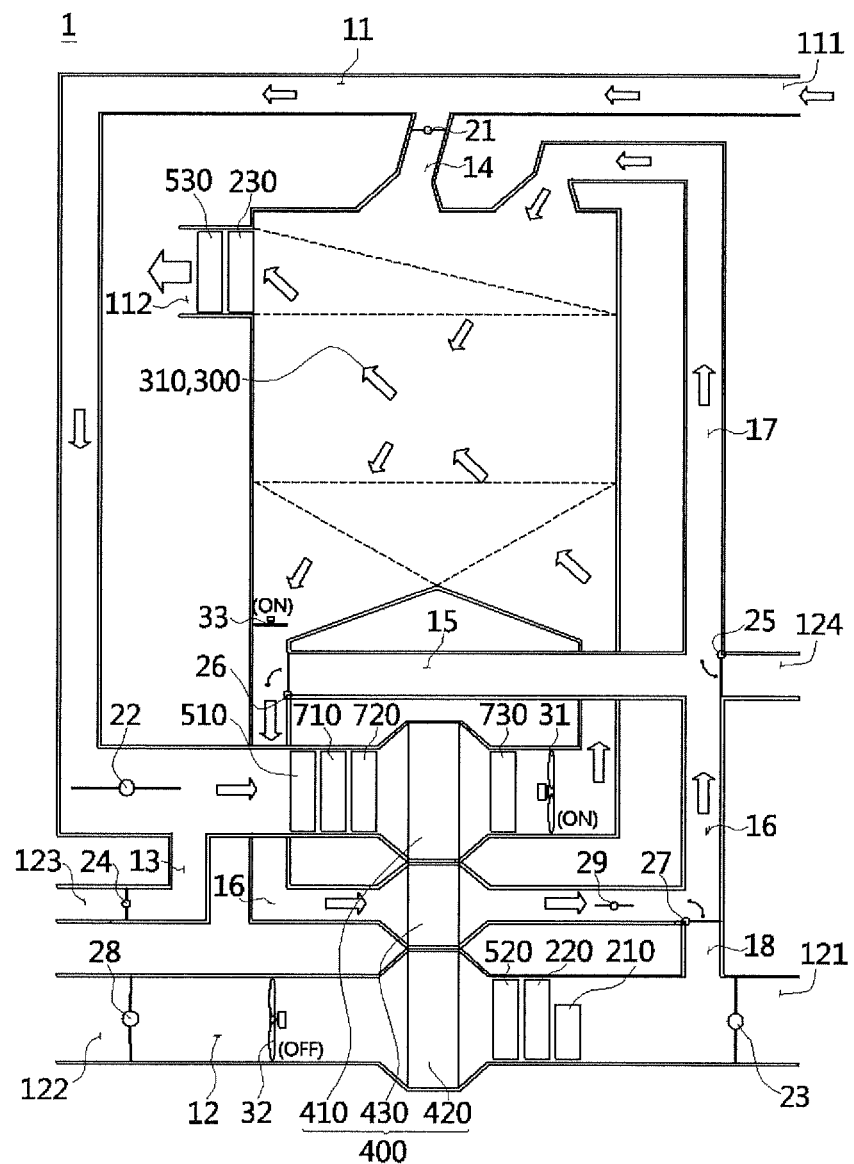

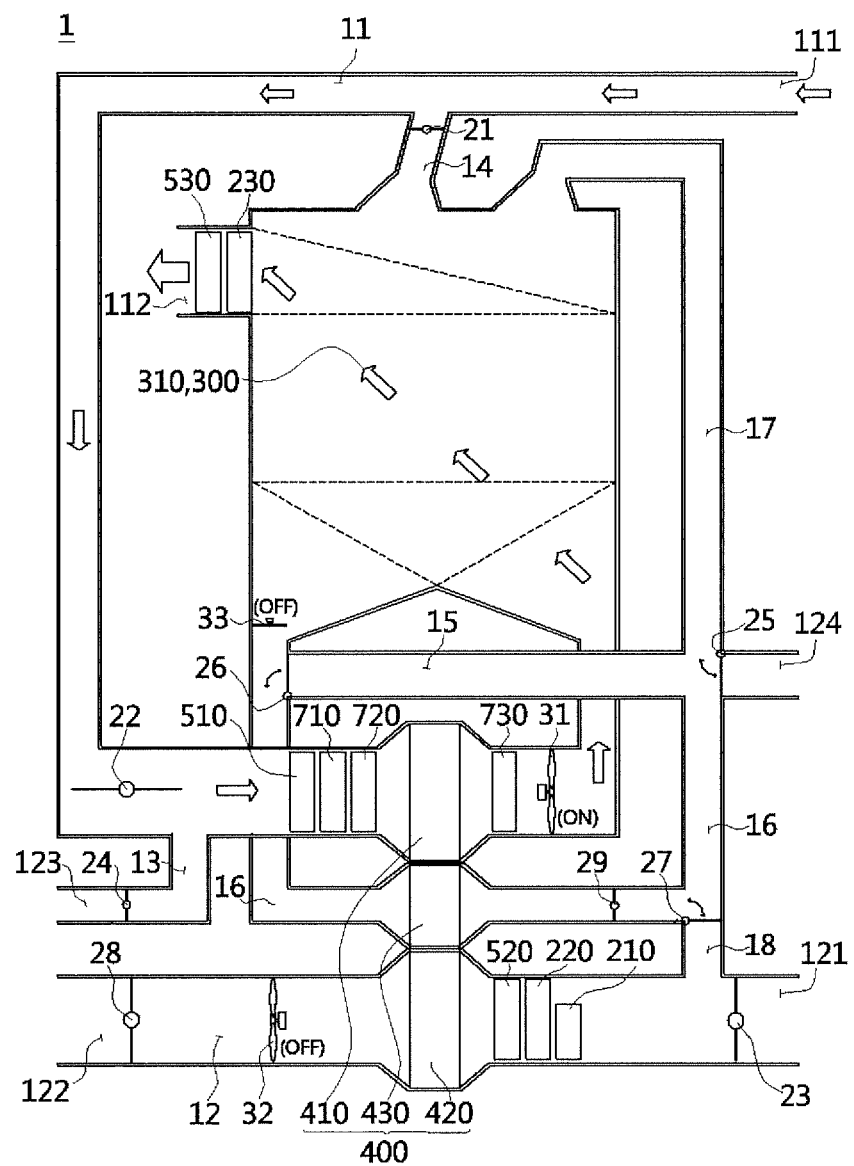
[FIG. 8]

AIR CONDITIONER AND CONTROLLING METHOD THEREOF

CROSS-REFERENCE TO RELATED APPLICATION

This application claims priority to and the benefit of Korean Patent Application No. 10-2017-0111354, filed on Aug. 31, 2017, the disclosure of which is incorporated herein by reference in its entirety.

BACKGROUND

1. Field of the Invention

The present disclosure relates to an air conditioner and a controlling method thereof, and more specifically, to an air conditioner in which ventilation is performed without a heat exchange process between outdoor air and indoor air, and a controlling method of the air conditioner.

2. Discussion of Related Art

Generally, an air conditioner is an apparatus configured to pleasantly maintain an indoor space by adjusting an indoor temperature and humidity or by circulating indoor air according to a demand of a user.

Recently, technologies capable of pleasantly maintaining indoor air depending on seasonal change according to a choice of a user have been developed by adding various functions such as dehumidification, humidification, air purification, ventilation, and the like to an air conditioner.

A dehumidification cooling system is disclosed in Korean Laid-Open Patent No. 10-2016-0088846 as a conventional technology related to the air conditioner.

Since a dehumidification cooling system according to a conventional technology can perform only a cooling operation, a ventilation operation, or a dehumidification operation, an air conditioner, to which a heating operation mode and a humidification operation mode are added, is demanded to be developed.

Further, water is directly injected to a condenser and then evaporated, and an indoor space is humidified using the evaporated vapor in the dehumidification cooling system according to the conventional technology. In this case, since the temperature of air humidified into the indoor space increases due to heat of the condenser, an indoor space temperature desired by a user is difficult to implement.

In addition, in the dehumidification cooling system according to the conventional technology, although a cooler is disclosed to be provided on a dehumidification path, and a regenerative and evaporative cooler is disclosed to be usable as the cooler, indoor space humidification using the regenerative and evaporative cooler is difficult to implement.

In addition, when the regenerative and evaporative cooler is used, since heat exchange between indoor air and outdoor air is performed during ventilation, a ventilation mode in which heat exchange is not performed cannot be implemented.

SUMMARY OF THE INVENTION

The present disclosure is directed to providing an air conditioner capable of improving user convenience because a ventilation mode in which heat exchange between indoor air and outdoor air is performed and a ventilation mode in which the heat exchange is not performed are selectable by a user and a controlling method of the air conditioner.

Further, the present disclosure is directed to providing an air conditioner in which all of dehumidification, cooling, humidification, heating, ventilation, and air purification are performable and a controlling method of the air conditioner.

In addition, the present disclosure is directed to providing an air conditioner capable of improving heat efficiency through a ventilation mode in which heat exchange between indoor air and outdoor air is performed and a controlling method of the air conditioner.

According to an aspect of the present disclosure, there is provided an air conditioner including an indoor introduction air path configured to introduce air into an indoor space, and an outdoor discharge air path configured to discharge air to an outdoor space, wherein the outdoor discharge air path includes an air path in which heat exchange is performed with the air introduced into the indoor space, and a by-pass path in which heat exchange is not performed with the air introduced into the indoor space, and the air conditioner further includes a controller configured to control the air discharged to the outdoor space so that the air discharged to the outdoor space flows to one of the air path, in which heat exchange is performed, and the by-pass path.

The air conditioner may further include an evaporative cooler including a dry channel connected to the indoor introduction air path, a humid channel having one end and the other end each connected to the outdoor discharge air path and the indoor introduction air path, and in which heat exchange is performed with air which passes through the dry channel, and a water supply part configured to supply moisture to air which flows through the humid channel, wherein the by-pass path may be provided at the outside of the evaporative cooler.

The air conditioner may include a dehumidification rotor including a first area and a second area through which the indoor air or the outdoor air passes so that the indoor air or the outdoor air adsorbs or drains moisture while passing through the first area and the second area, a first air path provided to communicate with the indoor space and configured to pass through the first area, and a second air path to communicate with the outdoor space and configured to pass through the second area, wherein the indoor introduction air path may include the first air path into which the indoor air is introduced and a third air path connected to the first air path and into which the outdoor air is introduced.

A fourth air path branched out from the first air path and into which the indoor air is introduced and a seventh air path configured to communicate with the fourth air path and connected to a location adjacent to the fourth air path may be connected to an inlet of the humid channel, and the by-pass path may include the fourth air path and the seventh air path.

The outdoor discharge air path configured to pass through the humid channel further may include a first discharge path and a second discharge path, the first discharge path may include a sixth air path connected to the outdoor space at outlet of the humid channel after passing through one area of the dehumidification rotor, and the second discharge path may include a fifth air path connected to the outdoor space at the outlet of the humid channel.

A sixth damper may be provided at a connection part, which is between the fifth air path and the sixth air path, and the air which passes through the humid channel may selectively flow through the fifth air path or the sixth air path to be discharged to the outdoor space by control of the sixth damper.

The seventh air path may have the other side connected to the fifth air path, the sixth air path and a fourth outer opening connected to the outdoor space to form a four way connection part, wherein the four way connection part may include a fifth damper and a path of air which flows through the fifth air path, the sixth air path, and the seventh air path may be set by control of the fifth damper.

The sixth air path and the second air path may be connected to each other through an eighth air path, a seventh damper may be provided at a connection part, which is between the sixth air path and the eighth air path to control the eighth air path so that the eighth air path may be opened or closed by control of the seven damper, and the by-pass path may be formed so that the indoor air which is introduced from the fourth air path may sequentially flow through the seventh air path, the sixth air path, the eighth air path, and the second air path to be discharged to the outdoor space through a second outer opening connected to the second air path.

A second blower may be provided in the second air path and suction indoor air which is introduced from the first air path so that the indoor air may flow through the by-pass path to be discharged to the outdoor space.

A third blower may be provided at the outlet of the humid channel and suction air which passes through the humid channel to be discharged to the outdoor space, and the controller may control the second blower and the third blower to control the indoor air which is introduced from the first air path so that the indoor air may selectively flow through the outdoor discharge air path configured to pass through the humid channel or the by-pass path to be discharged to the outdoor space.

The dehumidification rotor may further include a third area separated from the first area and the second area, and the sixth air path may pass through the third area.

In a controlling method of an air conditioner including an indoor introduction air path configured to introduce air into an indoor space, and an outdoor discharge air path configured to discharge air to an outdoor space, the method includes flowing the air discharged to the outdoor space through the outdoor discharge air path through a by-pass path so that heat exchange is performed with the air introduced into the indoor space or heat exchange is not performed with the air introduced into the indoor space, and controlling, by a controller, the air discharged to the outdoor space to flow through one of the air path, in which the heat exchange is performed, and the by-pass path.

The air discharged to the outdoor space may be discharged to the outdoor space after passing through a humid channel of an evaporative cooler in which the heat exchange is performed with the air, which passes through a dry channel of the evaporative cooler connected to the indoor introduction air path.

During a ventilation mode for ventilating indoor air and outdoor air, the controller may introduce the outdoor air into the indoor space after passing through the indoor introduction air path and a first area of a dehumidification rotor, and the controller may control the indoor air so that the indoor air may be discharged to the outdoor space through one of the outdoor discharge air path configured to pass through the humid channel and the by-pass path.

The air discharged to the outdoor space through the by-pass path may be controlled to be suctioned by a second blower provided in a second air path connected to a second area of the dehumidification rotor, and the air discharged to the outdoor space through the outdoor discharge air path configured to pass through the humid channel may be controlled to be suctioned by a third blower provided at an outlet of the humid channel.

The by-pass path may pass through the second area of the dehumidification rotor, and when the indoor air is discharged to the outdoor space through the by-pass path, the controller may control the dehumidification rotor so that the dehumidification rotor does not rotate.

When the indoor air is discharged to the outdoor space through the outdoor discharge air path configured to pass through the humid channel, the controller may control so that the indoor air is discharged to the outdoor space through one path between a path configured to pass through an area except the first area of the dehumidification rotor and a path which is connected to the path configured to pass through the area except the first area of the dehumidification rotor in parallel and thus does not pass through the dehumidification rotor.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 2 is a view illustrating an operation of a dehumidification cooling mode of the air conditioner according to the present disclosure;

FIG. 3 is a view illustrating an operation of a dehumidification cooling humidity adjusting mode of the air conditioner according to the present disclosure;

FIG. 4 is a view illustrating an operation of a ventilation mode of the air conditioner according to the present disclosure;

FIG. 5 is a view illustrating an operation of a ventilation humidification mode of the air conditioner according to the present disclosure;

FIG. 6 is a view illustrating an operation of a ventilation by-pass mode of the air conditioner according to the present disclosure;

FIG. 7 is a view illustrating an operation of a circulation humidification mode of the air conditioner according to the present disclosure; and FIG. 8 is a view illustrating an operation of an air purification mode of the air conditioner according to the present disclosure.

DETAILED DESCRIPTION OF EXEMPLARY EMBODIMENTS

Figure 1:
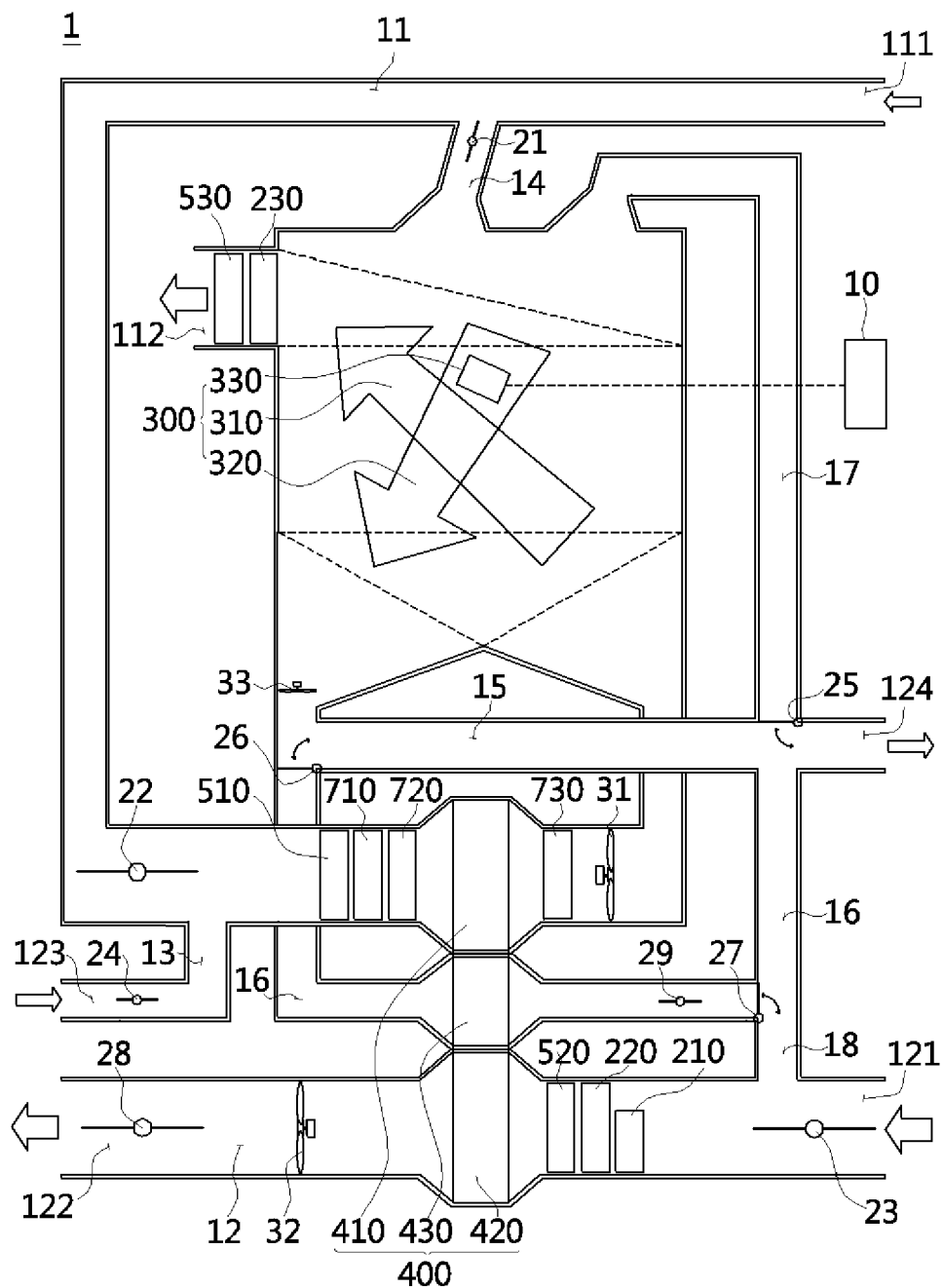
FIG. 1 is a view illustrating a schematic configuration of an air conditioner according to the present disclosure.

Hereinafter, an air conditioner according to the present disclosure will be described in detail with reference to the accompanying drawings.

A configuration of the air conditioner according to the present disclosure will be described with reference to FIG. 1.

An air conditioner 1 according to the present disclosure includes indoor introduction air paths 11 and 13 configured to introduce air into an indoor space, outdoor discharge air paths 14 and 15; and 14 and 16 configured to discharge air to an outdoor space, and a dehumidification rotor 400 including at least two areas 410, 420, and 430 through which the indoor air or the outdoor air passes and configured to adsorb or discharge moisture while the indoor air or the outdoor air passes through the areas 410, 420, and 430, and in this case, the outdoor discharge air paths 14 and 15; and 14 and 16 include a first discharge path 16, that is, a sixth air path configured to pass through one area among at least two areas 410, 420, and 430 of the dehumidification rotor 400, and a second discharge path 15, that is, a fifth air path which does not pass through the dehumidification rotor.

Since a first inner opening 111 and a second inner opening 112 configured to communicate with an indoor space, a first outer opening 121, a second outer opening 122, a third outer opening 123, and a fourth outer opening 124 configured to communicate with an outdoor space are formed in the air conditioner 1, the indoor air or the outdoor air may each be introduced into or discharged from the air conditioner 1. In this case, the first and second inner openings 111 and 112 may be combined and then branched out from one path, and the first to fourth outer openings 121, 122, 123 and 124 may also be combined and then branched out from at least one path.

The plurality of openings 111, 112, 121, 122, 123, and 124 communicate through a first air path 11, a second air path 12, a third air path 13, a fourth air path 14, a fifth air path 15, a sixth air path 16, a seventh air path 17, and an eighth air path 18 provided in the air conditioner 1.

The first air path 11 is a path configured to sequentially connect the first inner opening 111, the first area 410, a dry channel 310 of an evaporative cooler 300, and the second inner opening 112. The first inner opening 111 is provided at one side of the first air path 11 to introduce the indoor air (RA), and the second inner opening 112 is provided at the other side of the first air path 11 to discharge air which passes through the dry channel 310 of the evaporative cooler 300 to the indoor space (SA).

The second air path 12 is a path configured to sequentially connect the first outer opening 121, the second area 420, and the second outer opening 122. The first outer opening 121 is provided at one side of the second air path 12 to introduce the outdoor air (OA), and the second outer opening 122 is provided at the other side of the second air path 12 to discharge air which passes through the second air path 12 to the outdoor space (EA).

The third air path 13 is provided to introduce the outdoor air (OA), and has one side at which the third outer opening 123 is provided and the other side connected to the first air path 11.

The fourth air path 14 has one side connected to the first air path 11, and the other side connected to an inlet of a humid channel 320 of the evaporative cooler 300. Accordingly, extracted air, which is some of the indoor air introduced through the first inner opening 111, is introduced into the humid channel 320 of the evaporative cooler 300 through the fourth air path 14.

The fifth air path 15 has one side connected to an outlet of the humid channel 320 of the evaporative cooler 300, and the other side connected to the fourth outer opening 124 (EA). Further, the sixth air path 16 is a path having one side connected to the outlet of the humid channel 320 of the evaporative cooler 300, and the other side connected to the fourth outer opening 124. The sixth air path 16 is configured to pass through the third area 430 of the dehumidification rotor 400.

The fifth air path 15 and the sixth air path 16 are connected in parallel, and one side of the seventh air path 17 is further connected to a connection part, which is between the fifth air path 15 and the sixth air path 16.

The eighth air path 18 has one side connected to the sixth air path 16, and the other side connected to the second air path 12 including the first outer opening 121.

Since the fourth outer opening 124 is provided on the connection part, which is between the fifth air path 15, the sixth air path 16, and the seventh air path 17, a four way connection part is formed.

Since the outlet of the humid channel 320 of the evaporative cooler 300 is connected to the connection part, which is between the fifth air path 15 and the sixth air path 16, a three way connection part is formed.

Further, the other side of the fourth air path 14 and the other side of the seventh air path 17 communicate with each other, and are connected close to the inlet of the humid channel 320 of the evaporative cooler 300.

The air conditioner 1 further includes the evaporative cooler 300.

The evaporative cooler 300 includes the dry channel 310 and the humid channel 320, which are spaced apart from each other, and is configured so that heat exchange between air which flows through the dry channel 310 and air which flows through the humid channel 320 is performed.

The evaporative cooler 300 may have a structure in which a plurality of plates are spaced apart from each other at a predetermined interval to be stacked, and in this case, spaces between the plates spaced apart from each other alternatively configure the humid channel 320 and the dry channel 310. That is, the plates become media that is configured to both space the dry channel 310 and the humid channel 320 from each other and generate heat exchange between the dry channel 310 and the humid channel 320.

The humid channel 320 includes a water supply part 330 configured to supply moisture to the air which flows through the humid channel 320. The water supply part 330 may include a water supply pump configured to supply water and an injection nozzle configured to inject water supplied by the water supply pump.

When the water is injected to the air which flows through the humid channel 320, since the injected water is evaporated and cools the plates surrounding the humid channel 320, the air which flows through the dry channel 310 is cooled.

Further, the air having moisture due to flowing through the humid channel 320 may be used to humidify the indoor space, and an amount of the water injected by an operation of the water supply pump may be adjusted to adjust the temperature or humidity of the indoor space. The above-described process for the indoor space humidification will be described below.

In addition, the air which flows through the dry channel 310 and the air which flows through the humid channel 320 may form a counter-flow in a cross direction for efficient heat exchange, and the air having moisture may flow in an downward direction in the humid channel 320.

The dry channel 310 may be provided on the first air path 11, and the indoor air or the outdoor air which flows through the first air path 11 may be discharged through the first inner opening 111 after passing through the dry channel 310 to be introduced into the indoor space.

The fourth air path 14 and the seventh air path 17 may be connected to the inlet of the humid channel 320, and the air which flows through the fourth air path 14 or the seventh air path 17 may flow to the fifth air path 15 or the sixth air path 16 connected to the outlet of the humid channel 320 after passing through the humid channel 320.

The dehumidification rotor 400 is provided to rotate around a shaft provided at a center by a driving part (not shown), and includes an adsorption material to adsorb the moisture of the air.

The dehumidification rotor 400 may be partitioned into the first area 410, the second area 420, and the third area 430, and the first area 410, the second area 420, and the third area 430 may be located in the first air path 11, the second air path 12, and the sixth air path 16, respectively.

In this case, the first area 410 is located in the first air path 11 between a connection part, which is between the first air path 11 and the third air path 13, and an inlet of the dry channel 310.

The dehumidification rotor 400 adsorbs moisture from the air which flows through the first air path 11 in the first area 410 in a dehumidification cooling operation. In this case, when a part of the dehumidification rotor 400 in which the moisture is adsorbed rotates and reaches the second area 420, the air introduced into the indoor space is dehumidified by repeating a desiccant regeneration process due to the air which passes through the second air path 12.

The dehumidification rotor 400 adsorbs moisture from the air which includes moisture and flows through the sixth air path 16 by passing through the humid channel 320 at the third area 430 in a humidification operation. In this case, when a part of the dehumidification rotor 400 in which the moisture is adsorbed rotates and reaches the first area 410, the air introduced into the indoor space is humidified by repeating a process in which the air which flows through the first air path 11 includes moisture by passing through the dehumidification rotor 400 in which the moisture is adsorbed A dehumidifying agent such as silica gel, zeolite, or the like may be used as the adsorption material, and the adsorption material may have a pattern in a predetermined shape such as a comb pattern.

A desiccant polymer may be coated on a surface of the adsorption material. The desiccant polymer is an electrolyte polymer material, and is ionized when coming into contact with moisture, and since bacteria are removed from the adsorption material by an osmotic pressure due to an ion concentration difference when the moisture comes into contact with the adsorption material, an antibacterial effect is performed. Further, since ammonia, hydrogen sulfide, or the like which generates odor comes into contact with a desiccant polymer ionized into a polar molecule, a deodorization effect is performed. That is, silica or the zeolite may be used as the coated desiccant polymer which serves as a filter configured to purify the air.

A refrigeration cycle including a compressor 210 configured to compress the refrigerant at a high temperature and high pressure, a condenser 220, that is, a heating part configured to radiate heat of the refrigerant compressed in the compressor 210 at the high temperature and high pressure, an expansion valve (not shown) configured to expand the refrigerant which passes through the condenser 220 into a low temperature and low pressure state, and an evaporator 230, that is, a cooling part, which is configured to absorb heat of the air when the refrigerant which passes through the expansion valve is evaporated, may be provided in the plurality of paths 11, 12, 13, 14, 15, 16, 17, and 18.

The compressor 210 and the condenser 220 may be provided between the first outer opening 121 in the second air path 12 and the second area 420. That is, the compressor 210 and the condenser 220 may serve to heat the outdoor air introduced into the second area 420 through the first outer opening 121, and the heated indoor air passes through the second area 420 to regenerate the dehumidification rotor 400 during the dehumidification cooling operation.

The evaporator 230 may be provided at the first inner opening 111 which is an outlet of the dry channel 310, and may cool the air which passes through the first air path 11 and the dry channel 310 to be introduced into the indoor space to decrease a temperature of the indoor air.

At least one of the heating parts 510, 520, and 530 may be further provided in the plurality of paths 11, 12, 13, 14, 15, 16, 17, and 18.

The first heating part 510 provided in the first air path 11 is provided between the connection part, which is between the first air path 11 and the third air path 13, and the first area 410 to heat the air which passes through the first area 410 to be introduced into the indoor space through the first inner opening 111. That is, the first heating part 510 heats the first area 410 to improve humidity adjusting ability of the dehumidification rotor 400 and increases the temperature of the indoor air.

The second heating part 520 provided in the second air path 12 is provided between the first outer opening 121 and the second area 420 to heat the air introduced through the first outer opening 121 to pass through the second area 420. That is, the second heating part 520 heats the second area 420 to regenerate the dehumidification rotor 400.

The third heating part 530 provided at the first inner opening 111 heats the air which passes through the first air path 11 and the dry channel 310 to be introduced into the indoor space to quickly increase the temperature of the indoor air.

Each of the heating parts 510, 520, and 530 may include an electric heater or a hot water drain pipe, in which hot water flows, and may also include a condenser of a heat pump.

At least one blower 31, 32, and 33 and at least one damper 21, 22, 23, 24, 25, 26, 27, 28, and 29 may be provided in the plurality of paths 11, 12, 13, 14, 15, 16, 17, and 18 to set a flowing direction of the air.

The first blower 31 provided in the first air path 11 is provided between the first area 410 and the inlet of the dry channel 310 to suction the indoor air introduced through the first inner opening 111 or the outdoor air introduced through the third outer opening 123 so that the indoor air or the outdoor air flows through the first air path 11 to pass through the first area 410.

The air which passes through the first area 410 is introduced into the indoor space after passing through the dry channel 310, and the first air path 11 and the third air path 13 through which the air introduced into the indoor space flows refer to an indoor introduction air path.

The second blower 32 provided in the second air path 12 is provided between the second area 420 and the second outer opening 122 and suctions the outdoor air introduced through the first outer opening 121 or the indoor air which flows through the eighth air path 18 so that the indoor air or the outdoor air flows through the second area 420 to pass through the second area 420 and be discharged to the outdoor space through the second outer opening 122.

The third blower 33 provided at the outlet of the humid channel 320 suctions the air which flows through the fourth air path 14 or the seventh air path 17 so that the air passes through the humid channel 320 to flow to the fifth air path 15 or the sixth air path 16.

The eighth air path 18 and the second air path 12 refer to an outdoor discharge air path through which the air discharged to the outdoor space flows.

The air which passes through the humid channel 320 from the fourth air path 14 and flows through the fifth air path 15 or the sixth air path 16 may be discharged to the outdoor space through the fourth outer opening 124, and in this case, the fourth air path 14 and the fifth air path 15, or the fourth air path 14 and the sixth air path 16 also refer to the outdoor discharge air path.

Further, the air which passes through the humid channel 320 from the seventh air path 17 and flows through the fifth air path 15 or the sixth air path 16 may pass through the seventh air path 17 again and flow through the humid channel 320, and the fifth air path 15 or the sixth air path 16. In this case, a path configured to circulate the seventh air path 17, the humid channel 320, the fifth air path 15, and the seventh air path 17, and a path configured to circulate the seventh air path 17, the humid channel 320, the sixth air path 16, and the seventh air path 17 refer to a circulation path.

A first damper 21 provided in the fourth air path 14 opens or closes the fourth air path 14.

A second damper 22 provided in the first air path 11 is provided between a connection part, which is between the first air path 11 and the fourth air path 14, and the connection part, which is between the first air path 11 and the third air path 13, and opens or closes the first air path 11 into which the indoor air is introduced.

A third damper 23 provided in the second air path 12 is provided between a connection part, which is between the second air path 12 and the eighth air path 18 and the first outer opening 121, and opens or closes the first outer opening 121.

A fourth damper 24 provided in the third air path 13 opens or closes the third outer opening 123.

A fifth damper 25 provided in the four way connection part, which is between the fifth air path 15, the sixth air path 16, the seventh air path 17, and the fourth outer opening 124 opens or closes the seventh air path 17 or the fourth outer opening 124. That is, the fifth damper 25 closes the seventh air path 17 and opens the fourth outer opening 124 so that the air which flows from the fifth air path 15 or the sixth air path 16 is discharged to the outdoor space through the fourth outer opening 124, or closes the fourth outer opening 124 and opens the seventh air path 17 so that the air which flows from the fifth air path 15 or the sixth air path 16 flows to the humid channel 320 through the seventh air path 17.

A sixth damper 26 provided in the three way path connection part, which is between the outlet of the humid channel 320, the fifth air path 15, and the sixth air path 16, opens or closes the fifth air path 15 or the sixth air path 16. That is, the sixth damper 26 may close the fifth air path 15 and open the sixth air path 16 so that the air, which passes through the humid channel 320 and includes moisture, may flow to the sixth air path 16, or may close the sixth air path 16 and may open the fifth air path 15 so that the air which passes the humid channel 320 may flow to the fifth air path 15. In this case, when the sixth damper 26 opens the sixth air path 16, the air, which passes through the humid channel 320 and includes moisture, passes through the third area 430, and thus indoor air humidification is performed.

Further, an opening angle of the sixth damper 26 may be adjusted so that the fifth air path 15 and the sixth air path 16 may be partially opened at the same time, and the air which passes through the humid channel 320 and includes moisture may flow through both the fifth air path 15 and the sixth air path 16. In this case, the opening angle of the sixth damper 26 may be adjusted to adjust an amount of the air which flows to the fifth air path 15 and the sixth air path 16, and indoor space humidity may be adjusted according to an amount of the air which passes through the third area 430 provided in the sixth air path 16.

When the sixth air path 16 is closed and the fifth air path 15 is opened, the air which passes through the humid channel 320 flows through the fifth air path 15.

A seventh damper 27 provided in a connection part, which is between the sixth air path 16 and the eighth air path 18 closes the eighth air path 18 so that one side and the other side of the sixth air path 16 communicate, or opens the eighth air path 18 so that the one side and the other side of the sixth air path 16 are blocked at the same time.

An eighth damper 28 is provided in the second air path 12 between the second blower 32 and the second outer opening 122 to open or close the second outer opening 122.

A ninth damper 29 provided in the sixth air path 16 is provided between the connection part, which is between the sixth air path 16 and the eighth air path 18, and the third area 430, and opens or closes the sixth air path 16.

As described above, when the outlet of the humid channel 320 is configured to be selectively connected to the fifth air path 15 or the sixth air path 16, since the air which passes through the humid channel 320 is immediately discharged to the outdoor space through the fourth outer opening 124, or passes through the dehumidification rotor 400 during the dehumidification cooling mode and the ventilation mode, appropriate humidity may be maintained by adjusting the humidity and preventing excessive dryness of the indoor air while a cooling mode is operated, and since the humidity of the indoor air may be adjusted while the ventilation mode is operated, a pleasant indoor environment may be provided.

At least one of filters 710, 720, and 730 may be provided in the plurality of paths 11, 12, 13, 14, 15, 16, 17, and 18 to perform an air purification function.

For the air purification function, a first filter 710 and a second filter 720 may be provided between the connection part, which is between the first air path 11 and the third air path 13, and the first area 410, and a third filter 730 may be provided between the first area 410 and the first blower 31.

The indoor air introduced through the first inner opening 111 and the outdoor air introduced through the third outer opening 123 are purified and introduced into the indoor space through the second inner opening 112 by sequentially passing through the first filter 710, the second filter 720, the first area 410, and the third filter 730.

The first filter 710, the second filter 720, and the third filter 730 may each include a PRE filter, a deodorization filter, and a HEPA filter.

The air conditioner 1 according to the present disclosure may further include a controller 10, and the controller 10 may control an on/off operation, a velocity, and operation intensity of each of the dehumidification rotor 400, the water supply part 330 of the evaporative cooler 300, the compressor 210, the condenser 220, and the evaporator 230, which configure the refrigeration cycle, the at least one of the heating parts 510, 520, and 530, the blowers 31, 32, and 33, and the like according to conditions such as the temperature, the humidity, and the like of the indoor air, and a setting mode, and may control the plurality of dampers 21, 22, 23, 24, 25, 26, 27, 28, and 29 to open or close.

Since the cooling, the heating, the dehumidification, the humidification, the ventilation and the air purification of the air supplied to the indoor space through the indoor introduction air path are performed by control of the air conditioner 1 according to the present disclosure performed by the controller 10, pleasant air may be supplied to the indoor space. Further, since the air path is configured so that all of various control modes are implemented in the air conditioner, the various control modes desired by the user may be implemented and user convenience may be improved.

In this case, the temperature and the humidity of the indoor space may be measured by a temperature sensor (not shown) and a humidity sensor (not shown), and the measured temperature and humidity data of the indoor space may be transmitted to the controller 10.

Referring to FIG. 2, an operation of a dehumidification cooling mode of the above-described air conditioner 1 according to the present disclosure will be described.

When the dehumidification cooling mode is operated, the controller 10 controls the second damper 22, the first damper 21, and the fourth damper 24 to open the first air path 11, the fourth air path 14, and the third air path 13. Further, the fifth damper 25 closes the seventh air path 17, the sixth damper 26 closes the sixth air path 16, the seventh damper 27 closes the eighth air path 18, and the ninth damper 29 closes the sixth air path 16.

In this state, the first blower 31, the third blower 33, the water supply part 330 of the evaporative cooler 300, the compressor 210, the condenser 220, and the evaporator 230 are turned on, and the first heating part 510 and the third heating part 530 are turned off.

Further, the controller 10 controls the third damper 23 and the eighth damper 28 to open the second air path 12, turn on the second blower 32 and the second heating part 520, and rotate the dehumidification rotor 400.

Accordingly, some of the indoor air introduced into the first air path 11 through the first inner opening 111 flows through the first air path 11 to pass through the first area 410 of the dehumidification rotor 400, and the air which passes through the first area 410 is discharged to the indoor space through the second inner opening 112 after passing through the dry channel 310 of the evaporative cooler 300.

The remaining indoor air introduced into the first air path 11 through the first inner opening 111 is discharged to the outdoor space through the fifth air path 15 and the fourth outer opening 124 after passing through the humid channel 320 of the evaporative cooler 300 through the fourth air path 14. In this case, since the water injected from the water supply part 330 of the humid channel 320 absorbs heat while being evaporated to cool a plate forming a boundary between the humid channel 320 and the dry channel 310, the air which flows through the dry channel 310 is cooled by the plate which is cooled.

Further, the outdoor air introduced into the second air path 12 through the first outer opening 121 passes through the compressor 210 and the condenser 220 to be primarily heated and is secondarily heated by the second heating part 520. The heated air of a high temperature passes through the second area 420 to regenerate the dehumidification rotor 400 by drying, and the part of the dehumidification rotor 400 dried to be regenerated rotates and is located at the first area 410.

Accordingly, since the indoor air and the outdoor air introduced into the first air path 11 and the third air path 13 through the first inner opening 111 and the third outer opening 123, pass through the first area 410 of the dehumidification rotor 400, which is dried to be regenerated, so that the moisture in the air is adsorbed by the dehumidification rotor 400 which is dried to be regenerated, and pass through the dry channel 310 and the evaporator 230 to be doubly cooled, the dry and cool air is introduced into the indoor space through the second inner opening 112 to perform the dehumidification cooling.

In this case, supplying moisture from the water supply part 330 of the evaporative cooler 300 is stopped, and when an operation of the evaporator 230 is stopped, cooling may not be performed, and only dehumidification may be performed.

Referring to FIG. 3, an operation of a humidity adjusting mode of the dehumidification cooling mode of the above-described air conditioner 1 according to the present disclosure will be described.

When the humidity adjusting mode of the dehumidification cooling mode is operated, a change of an opening and closing location of each of the sixth damper 26 and the ninth damper 29 is the only difference compared with the dehumidification cooling mode, and operations of other configurations are the same as those during the dehumidification cooling mode described in FIG. 2.

The sixth damper 26 closes the fifth air path 15 so that the air which passes through the humid channel 320 flows through the sixth air path 16, and the ninth damper 29 opens the sixth air path 16.

Accordingly, some of the indoor air introduced into the fourth air path 14 through the first inner opening 111 becomes humid air, which includes the moisture, by passing through the humid channel 320. The air which passes through the humid channel 320 flows through the sixth air path 16 and passes through the third area 430 of the dehumidification rotor 400, and thus the moisture is adsorbed to the adsorption material of the third area 430, and a part of the dehumidification rotor 400 to which the moisture is adsorbed rotates to be located at the first area 410. The air which passes through the third area 430 is discharged to the outdoor space through the fourth outer opening 124 after flowing through the sixth air path 16.

The dehumidification rotor 400 which adsorbs the moisture at the third area 430 rotates to be located at the first area 410, and when the part to which the moisture is adsorbed is located at the first area 410, the moisture is drained to the air which passes through the first area 410. Since the air which passes through the first area 410 is introduced into the indoor space through the second inner opening 112 after passing through the dry channel 310, humidity adjusting and cooling for the indoor air are performed.

When a rotating direction of the dehumidification rotor 400 is set so that the dehumidification rotor 400 is located at the first area 410 after passing through the third area 430 from the second area 420, or the first to third areas 410, 420, and 430 are disposed, a moisture supply amount to the air which passes through the first area 410 may increase. That is, when the part of the dehumidification rotor 400 in a dry state after regeneration in the second area 420 is located at the third area 430, a moisture adsorption amount may increase, and further, when the part is located at the first area 410, the moisture supply amount to the air which passes through the first area 410 may increase. Of course, when the third area 430, the second area 420, and the first area 410 sequentially rotate in a direction opposite the above-described rotating direction, the moisture supply amount may decrease. According to the above configuration, when the moisture supply amount of the water supply part 330 is adjusted, since an amount of the moisture adsorbed to the third area 430 and an amount of the moisture drained from the first area 410 may be adjusted, an indoor space humidification amount may be adjusted.

Further, when a cooling humidity adjusting mode of the dehumidification cooling mode is operated, the controller 10 may adjust the sixth damper 26 to open the fifth air path 15 and the sixth air path 16 at the same time, and an opening degree of each of the fifth air path 15 and the sixth air path 16 may be adjusted according to the humidity of the indoor air.

That is, since the sixth air path 16 is more broadly opened when the indoor air becomes drier, and most of the air, which passes through the humid channel 320 and includes moisture passes through the third area 430, the amount of the moisture adsorbed to the dehumidification rotor 400 increases and the amount of the moisture drained from the air which passes through the first area 410 increases, and thus humidity of the air introduced into the indoor space through the second inner opening 112 increases and strong humidification is performed.

On the other hand, since the fifth air path 15 is more broadly opened when the indoor air becomes more humid, and some of the air, which passes through the humid channel 320 and includes moisture passes through the third area 430, the amount of the moisture adsorbed to the dehumidification rotor 400 decreases and the amount of the moisture drained from the air which passes through the first area 410 decreases, and thus the humidity of the air introduced into the indoor space through the second inner opening 112 decreases and weak humidification is performed.

According to the above-described controlling method, since the indoor air may be humidified during the dehumidification cooling, the indoor air may be maintained in a more pleasant state. Further, since whether the indoor space is humidified or not during the dehumidification cooling mode may be selected by a user, user convenience may be improved.

Referring to FIG. 4, an operation of a ventilation mode of the above-described air conditioner 1 according to the present disclosure will be described.

When the ventilation mode is operated, the controller 10 controls the first damper 21 and the fourth damper 24 to open the fourth air path 14 and the third air path 13. The fifth damper 25 closes the seventh air path 17, the sixth damper 26 closes the sixth air path 16, the seventh damper 27 closes the eighth air path 18, and the ninth damper 29 closes the sixth air path 16.

The first blower 31 and the third blower 33 are turned on, and the water supply part 330 of the evaporative cooler 300, the first heating part 510, the third heating part 530, the compressor 210, the condenser 220, and the evaporator 230 are turned off.

Further, the controller 10 controls the third damper 23 and the eighth damper 28 to close the first outer opening 121, the second outer opening 122, and the second air path 12, and the controller 10 turns off the second blower 32 and the second heating part 520, but does not rotate the dehumidification rotor 400.

Accordingly, the indoor air introduced into the fourth air path 14 through the first inner opening 111 flows through the fifth air path 15 to be discharged to the outdoor space through the fourth outer opening 124 after passing through the humid channel 320 of the evaporative cooler 300.

Further, the outdoor air introduced into the first air path 11 by flowing through the third air path 13 through the third outer opening 123 flows through the first area 410 and the dry channel 310 to be introduced into the indoor space through the second inner opening 112.

Accordingly, ventilation between the indoor air and the outdoor air may be performed, and in this case, the outdoor air which passes through the dry channel 310 and the indoor air which passes through the humid channel 320 may have sensible heat exchange therebetween.

Referring to FIG. 5, an operation of a humidification mode of the ventilation mode of the above-described air conditioner 1 according to the present disclosure will be described.

When the humidification mode of the ventilation mode is operated, the change of the opening and closing location of each of the sixth damper 26 and the ninth damper 29, and whether the moisture is provided from the water supply part 330 of the evaporative cooler 300 are the only differences compared with the ventilation mode, and operations of other configurations are the same as those during the ventilation mode described in FIG. 4.

The sixth damper 26 closes the fifth air path 15 so that the air which passes through the humid channel 320 flows to the sixth air path 16, and the ninth damper 29 opens the sixth air path 16.

Accordingly, some of the indoor air introduced into the fourth air path 14 through the first inner opening 111 becomes the humid air, which includes moisture while passing through the humid channel 320. The air which passes through the humid channel 320 flows through the sixth air path 16 and passes through the third area 430 of the dehumidification rotor 400, and thus the moisture is adsorbed to the adsorption material of the third area 430, and the part of the dehumidification rotor 400 to which the moisture is adsorbed rotates to be located at the first area 410. The air which passes through the third area 430 is discharged to the outdoor space through the fourth outer opening 124 after flowing through the sixth air path 16.

The dehumidification rotor 400 which adsorbs the moisture at the third area 430 rotates to be located at the first area 410, and when the part to which the moisture is adsorbed is located at the first area 410, the moisture is drained to the air which passes through the first area 410. Since the air which passes through the first area 410 is introduced into the indoor space through the second inner opening 112 after passing through the dry channel 310, the humidity adjusting and ventilation for the indoor air are performed.

Meanwhile, in this case, the first heating part 510 may be configured to be turned on. In this case, the outdoor air introduced into the first air path 11 by flowing through the third air path 13 through the third outer opening 123 passes through the first area 410 of the dehumidification rotor 400 and receives the moisture from the dehumidification rotor 400 after being heated by the first heating part 510 to increase a containable amount of the moisture, and the air which passes through the dry channel 310 and is cooled to include the moisture is introduced into the indoor space through the second inner opening 112.

According to the controlling method, since the indoor air may be humidified during the ventilation mode, the indoor air may be maintained in the more pleasant state. Further, since whether the indoor space is humidified or not during the ventilation mode may be selected by the user, the user convenience may be improved. In addition, since the humidification may be performed using the moisture supplied from the water supply part 330 of the evaporative cooler 300, a separate water supply part for the humidification may not be necessary and complexity of the configuration of the air conditioner may be prevented. In addition, since first heat exchange between the outdoor air and the indoor air is performed in the evaporative cooler 300, and second heat exchange is performed in the dehumidification rotor 400, heat of the air discharged to the outdoor space may be used and thus heat efficiency may be improved.

Referring to FIG. 6, an operation of a by-pass mode of the ventilation mode of the above-described air conditioner 1 according to the present disclosure will be described.

When the by-pass mode is operated, the controller 10 controls the first damper 21 and the fourth damper 24 to open the fourth air path 14 and the third air path 13.

Further, the fifth damper 25 closes the fourth outer opening 124, the sixth damper 26 closes the fifth air path 15, and the seventh damper 27 and the ninth damper 29 close the sixth air path 16 so that the eighth air path 18 is opened.

In this state, the first blower 31 and the second blower 32 are turned on, and the third blower 33, the water supply part 330 of the evaporative cooler 300, the first heating part 510, the third heating part 530, the compressor 210, the condenser 220, and the evaporator 230 are turned off.

Further, the controller 10 controls the third damper 23 to close the first outer opening 121, and the controller 10 controls the eighth damper 28 to open the second outer opening 122 and the second air path 12, turns on the second blower 32, and turns off the second heating part 520, but does not rotate the dehumidification rotor 400.

Accordingly, since the indoor air introduced into the fourth air path 14 through the first inner opening 111 is suctioned by the second blower 32 regardless of the third blower 33, the air flows through a by-pass path sequentially connected to the seventh air path 17, the eighth air path 18, a part of the sixth air path 16, and the second air path 12 through a space at the inlet of the humid channel 320 of the evaporative cooler 300, which is a connection part, which is between the fourth air path 14 and the seventh air path 17, to be discharged to the outdoor space through the second outer opening 122.

Further, the outdoor air introduced into the first air path 11 by flowing through the third air path 13 through the third outer opening 123 flows through the first area 410 and the dry channel 310 to be introduced into the indoor space through the second inner opening 112.

In this case, since the dehumidification rotor 400 does not rotate, the humidity of the air which passes through the first area 410 does not change.

Particularly, the ventilation may be performed without a heat exchange process between the indoor introduction air path, through which the air passes through the dry channel 310 to be introduced into the indoor space, and the outdoor discharge air path, through which the air flows through the seventh air path 17, the eighth air path 18, and the second air path 12 through the connection part, which is between the fourth air path 14 and the seventh air path 17 to be discharged to the outdoor space in the by-pass mode.

That is, since the air which passes through the fourth air path 14 in the evaporative cooler 300 directly flows to the seventh air path 17 without passing through the humid channel 320, the sensible heat exchange with the dry channel 310 is not performed. Further, since the dehumidification rotor 400 does not rotate, total heat exchange performed between one area and the other area when the dehumidification rotor 400 rotates is not performed.

Accordingly, since the ventilation may be performed without heat exchange between the indoor air and the outdoor air, and various ventilation modes may be implemented through the above-described ventilation mode and the by-pass mode including the humidification mode of the ventilation mode to prevent the heat exchange, the user convenience may be improved. Further, since the humidification may be performed using the moisture supplied from the water supply part 330 of the evaporative cooler 300, the separate water supply part for the humidification may not be necessary and the complexity of the configuration of the air conditioner may be prevented.

Referring to FIG. 7, an operation of a circulation humidification mode of the above-described air conditioner 1 according to the present disclosure will be described.

Here, the circulation humidification mode refers to a case in which an air path configured to supply the moisture to the indoor air has a path which circulates in the air conditioner when the indoor air is humidified.

When the circulation humidification mode is operated, the controller 10 controls the second damper 22 and the ninth damper 29 to open the first air path 11 and the sixth air path 16, and the first damper 21, the fourth damper 24, the fifth damper 25, the sixth damper 26, and the seventh damper 27 close the fourth air path 14, the third air path 13, the fourth outer opening 124, the fifth air path 15, and the eighth air path 18, respectively.

In this state, the first blower 31, the third blower 33, the water supply part 330 of the evaporative cooler 300, and the first heating part 510 are turned on, and the compressor 210, the condenser 220, the evaporator 230, and the third heating part 530 are turned off.

Further, the controller 10 controls the third damper 23 and the eighth damper 28 to close the second air path 12, turns off the second blower 32 and the second heating part 520, and rotates the dehumidification rotor 400.

In this case, the air in the humid channel 320 of the evaporative cooler 300 repetitively flows along the circulation path including the humid channel 320, the sixth air path 16, and the seventh air path 17 due to an operation of the third blower 33.

The air, which passes through the humid channel 320 and includes moisture due to the water supply part 330, flows through the sixth air path 16 and passes through the third area 430 of the dehumidification rotor 400 so that the moisture is adsorbed to the dehumidification rotor 400, and the part of the dehumidification rotor 400 to which the moisture is adsorbed rotates to be located at the first area 410.

Accordingly, the indoor air introduced through the first inner opening 111 to flow through the first air path 11 passes through the first area 410 of the dehumidification rotor 400 and receives the moisture from the dehumidification rotor 400 after being heated by the first heating part 510 to increase a containable amount of the moisture and then is introduced into the indoor space through the second inner opening 112 after passing through the dry channel 310.

According to the above configuration, since the air in the air conditioner 1 circulates in the circulation path and supplies the moisture to the indoor air, circulation and the humidification of the indoor air are performed. Accordingly, since the outdoor air is not introduced into the air conditioner 1 during the indoor space humidification even when the temperature of the outdoor air is low, the heat energy efficiency may be improved.

Meanwhile, although the circulation path is configured to pass through the third area 430 in the above description, the circulation path may be configured to pass through the second area 420 when the dehumidification rotor 400 includes only the first area 410 and the second area 420.

That is, the dehumidification rotor 400 includes the first area 410 and the second area 420, one side of the sixth air path 16 is connected to the second air path 12 at one side of the second area 420 (that is, a left side in FIG. 7), and a part of the sixth air path 16 configured to pass through the third area 430 is removed. Accordingly, the circulation path may include a path configured to repetitively circulate through the humid channel 320, one side of the sixth air path 16, one side of the second air path 12, the second area 420, the other side of the second air path 12, the eighth air path 18, the other side of the sixth air path 16, the seventh air path 17, and the humid channel 320.

Although cold outdoor air is also not introduced into the air conditioner 1 in this case, like an embodiment shown in FIG. 7, since the second air path 12 is a configuration through which the outdoor air flows and thus has a lower temperature in the winter compared with the air in the sixth air path 16 which passes through the third area 430, the heat efficiency may be lower than that in FIG. 7.

Referring to FIG. 8, an operation of an air purification mode of the above-described air conditioner 1 according to the present disclosure will be described.

When the air purification mode is operated, the controller 10 controls the second damper 22 to open the first air path 11, and the first damper 21, the fourth damper 24, the fifth damper 25, the sixth damper 26, the seventh damper 27, and the ninth damper 29 close the fourth air path 14, the third air path 13, the fourth outer opening 124, the fifth air path 15, the sixth air path 16, and the eighth air path 18, respectively.

In this state, the first blower 31 is turned on, and the third blower 33, the water supply part 330 of the evaporative cooler 300, the first heating part 510, the third heating part 530, the compressor 210, the condenser 220, and the evaporator 230 are turned off.

Further, the controller 10 controls the third damper 23 and the eighth damper 28 to close the second air path 12, turns off the second blower 32 and the second heating part 520 and does not rotate the dehumidification rotor 400.

Accordingly, the indoor air introduced through the first inner opening 111 is filtered by flowing through the first air path 11 while sequentially passing through the first filter 710, the second filter 720, the first area 410, and the third filter 730 located in the first air path 11, and thus the indoor air may be circulated and purified.

Meanwhile, when the indoor space needs to be heated, since the third heating part 530 is turned on and the air introduced into the indoor space through the second inner opening 112 is heated, heating may be performed, and the heating mode may also be applied to the ventilation mode, the circulation mode, and the air purification mode shown in FIGS. 4 to 8.

In an air conditioner according to the present disclosure and a controlling method of the air conditioner, since a user can select a ventilation mode in which heat exchange between indoor air and outdoor air is performed and a ventilation mode in which the heat exchange is not performed, user convenience can be improved.

Further, since all of various control modes are implemented in one air conditioner, the various control modes desired by the user can be implemented, and thus user convenience can be improved.

In addition, when the ventilation mode in which the heat exchange between the indoor air and the outdoor air is performed is operated, heat efficiency can be improved.

In addition, since cooling and humidification can be performed using moisture supplied from an evaporative cooler, a separate water supply part for the humidification does not have to be provided, and thus complexity of a configuration of the air conditioner can be prevented.

In addition, heat loss due to cold air of an outdoor space can be prevented using, not the outdoor air, but air in the air conditioner to humidify during indoor humidification.

In addition, appropriate humidity can be maintained by adjusting humidity and preventing excessive dryness of the indoor air while a cooling mode is operated.

In addition, since humidity of indoor air can be adjusted while the ventilation mode is operated, a pleasant indoor environment can be provided.

In addition, since the ventilation mode is operated to allow the indoor air to pass through the dehumidification rotor to adjust indoor humidity or prevent the indoor air from passing through the dehumidification rotor in a process in which the indoor air is discharged to the outdoor space, the user can variously select operation modes, and thus user convenience can be improved.

As described above, although the present disclosure is described in detail with exemplary embodiments, the present disclosure is not limited to the above-described embodiments, changes may be made within the scope of each of the claims, detailed descriptions, and the accompanying drawings, and the above may be included in the present disclosure.

DESCRIPTION OF REFERENCE NUMERALS

| | |
|---|---|
| 1: air conditioner | 11: first air path |
| 12: second air path | 13: third air path |
| 14: fourth air path | 15: fifth air path |
| 16: sixth air path | 17: seventh air path |
| 18: eighth air path | 21: first damper |
| 22: second damper | 23: third damper |
| 24: fourth damper | 25: fifth damper |
| 26: sixth damper | 27: seventh damper |
| 28: eighth damper | 29: ninth damper |
| 31: first blower | 32: second blower |
| 33: third blower | 111: first inner opening |
| 112: second inner opening | 121: first outer opening |
| 122: second outer opening | 123: third outer opening |
| 124: fourth outer opening | 210: compressor |
| 220: condenser | 230: evaporator |
| 300: evaporative cooler | 310: dry channel |
| 320: humid channel | 400: dehumidification rotor |
| 410: first area | 420: second area |
| 430: third area | 510: first heating part |
| 520: second heating part | 530: third heating part |
| 710: first filter | 720: second filter |
| 730: third filter | |

What is claimed is:
1. An air conditioner comprising:
an indoor introduction air path that introduces air into an indoor space;
an outdoor discharge air path that discharges air to an outdoor space; and
an evaporative cooler including a dry channel connected to the indoor introduction air path, a humid channel having one end and the other end each connected to the outdoor discharge air path and the indoor introduction air path, and in which heat exchange is performed with air which passes through the dry channel, and a water supply part that supplies moisture to air which flows through the humid channel,
wherein the outdoor discharge air path includes an air path that includes the humid channel in which the air flowing through the humid channel performs heat exchange with the air which passes through the dry channel, and a by-pass path in which air flows through the by-pass path does not perform heat exchange with the air which passes through the dry channel, wherein the by-pass path is provided outside of the evaporative cooler and connected to a location adjacent to an inlet of the humid channel, and wherein the air conditioner further comprises a controller that controls the air discharged to the outdoor space so that the air discharged to the outdoor space flows to one of the air paths, in which heat exchange is performed, and the by-pass path.

2. The air conditioner of claim 1, further comprising:

a dehumidification rotor including a first area and a second area through which the indoor air or the outdoor air passes so that the indoor air or the outdoor air adsorbs or drains moisture while passing through the first area and the second area;

a first air path provided to communicate with the indoor space and configured to pass through the first area; and a second air path to communicate with the outdoor space and configured to pass through the second area, wherein the indoor introduction air path includes the first air path into which the indoor air is introduced and a third air path connected to the first air path and into which the outdoor air is introduced.

3. The air conditioner of claim 2, wherein:

a fourth air path branched out from the first air path and into which the indoor air is introduced and a seventh air path configured to communicate with the fourth air path and connected to a location adjacent to the fourth air path are connected to the inlet of the humid channel; and the by-pass path includes the fourth air path and the seventh air path.

4. The air conditioner of claim 3, wherein:

the outdoor discharge air path configured to pass through the humid channel further includes a first discharge path and a second discharge path, wherein the first discharge path includes a sixth air path connected to the outdoor space at an outlet of the humid channel after passing through one area of the dehumidification rotor, and the second discharge path includes a fifth air path connected to the outdoor space at the outlet of the humid channel.

5. The air conditioner of claim 4, wherein:

a sixth damper is provided at a connection part, which is between the fifth air path and the sixth air path; and the air which passes through the humid channel selectively flows through the fifth air path or the sixth air path to be discharged to the outdoor space by control of the sixth damper.

6. The air conditioner of claim 4, wherein the seventh air path has the other side connected to the fifth air path, the sixth air path, and a fourth outer opening connected to the outdoor space to form a four-way connection part, wherein the four-way connection part includes a fifth damper and a path of air which flows through the fifth air path, the sixth air path, and the seventh air path is set by control of the fifth damper.

7. The air conditioner of claim 6, wherein:

the sixth air path and the second air path are connected to each other through an eighth air path;

a seventh damper is provided at a connection part, which is between the sixth air path and the eighth air path to control the eighth air path so that the eighth air path is opened or closed; and the by-pass path is formed so that the indoor air which is introduced from the fourth air path sequentially flows through the seventh air path, the sixth air path, the eighth air path, and the second air path to be discharged to the outdoor space through a second outer opening connected to the second air path.

8. The air conditioner of claim 2, wherein a second blower is provided in the second air path and suctions indoor air which is introduced from the first air path so that the indoor air flows through the by-pass path to be discharged to the outdoor space.

9. The air conditioner of claim 8, wherein:

a third blower is provided at an outlet of the humid channel and suctions air which passes through the humid channel to be discharged to the outdoor space; and the controller controls the second blower and the third blower to control the indoor air which is introduced from the first air path so that the indoor air selectively flows through the outdoor discharge air path configured to pass through the humid channel or the by-pass path to be discharged to the outdoor space.

10. The air conditioner of claim 4, wherein:

the dehumidification rotor further includes a third area separated from the first area and the second area; and the sixth air path passes through the third area.

11. A controlling method of an air conditioner including an indoor introduction air path that introduces air into an indoor space, an outdoor discharge air path that discharges air to an outdoor space, and an evaporative cooler including a dry channel connected to the indoor introduction air path, a humid channel having one end and the other end each connected to the outdoor discharge air path and the indoor introduction air path, and in which heat exchange is performed with air which passes through the dry channel, and a water supply part that supplies moisture to air which flows through the humid channel, the method comprising:

flowing the air discharged to the outdoor space through the outdoor discharge air path through a by-pass path which is provided outside of the evaporative cooler and connected to a location adjacent to an inlet of the humid channel so that air flowing through the by-pass path performs heat exchange with the air which passes through the dry channel or the air flowing through the by-pass path does not perform heat exchange with the air which passes through the dry channel; and controlling, by a controller, the air discharged to the outdoor space to flow through one of the air paths including the humid channel, in which the heat exchange is performed, and the by-pass path.

12. The controlling method of claim 11, wherein, during a ventilation mode for ventilating indoor air and outdoor air, the controller introduces the outdoor air into the indoor space after passing through the indoor introduction air path and a first area of a dehumidification rotor, and the controller controls the indoor air so that the indoor air is discharged to the outdoor space through one of the outdoor discharge air path configured to pass through the humid channel and the by-pass path.

13. The controlling method of claim 12, wherein:

the air discharged to the outdoor space through the by-pass path is controlled to be suctioned by a second blower provided in a second air path connected to a second area of the dehumidification rotor; and the air discharged to the outdoor space through the outdoor discharge air path configured to pass through the humid channel is controlled to be suctioned by a third blower provided at an outlet of the humid channel.

14. The controlling method of claim 12, wherein the by-pass path passes through the second area of the dehumidification rotor, and when the indoor air is discharged to the outdoor space through the by-pass path, the controller controls the dehumidification rotor so that the dehumidification rotor does not rotate.

15. The controlling method of claim 12, wherein, when the indoor air is discharged to the outdoor space through the outdoor discharge air path configured to pass through the humid channel, the controller controls so that the indoor air is discharged to the outdoor space through one path between a path configured to pass through an area except for the first area of the dehumidification rotor and a path which is connected to the path configured to pass through the area except for the first area of the dehumidification rotor in parallel and thus does not pass through the dehumidification rotor.

* * * * *